(12) United States Patent
Kamata

(10) Patent No.: US 8,970,857 B2
(45) Date of Patent: Mar. 3, 2015

(54) SYSTEM, IMAGE FORMING APPARATUS, AND METHOD FOR EXTRACTING DATA FROM A SET OF ELECTRONIC DATA BASED ON A PREDETERMINED CONDITION

(75) Inventor: Tamaki Kamata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 13/355,387

(22) Filed: Jan. 20, 2012

(65) Prior Publication Data

US 2012/0194837 A1  Aug. 2, 2012

(30) Foreign Application Priority Data

Jan. 27, 2011  (JP) .................................. 2011-014741

(51) Int. Cl.
*G06F 3/12* (2006.01)
*H04N 1/00* (2006.01)
*H04N 1/32* (2006.01)
*H04N 1/44* (2006.01)

(52) U.S. Cl.
CPC ....... *H04N 1/00244* (2013.01); *H04N 1/32432* (2013.01); *H04N 1/32438* (2013.01); *H04N 1/32448* (2013.01); *H04N 1/4413* (2013.01); *H04N 1/4426* (2013.01); *H04N 1/444* (2013.01); *H04N 2201/0039* (2013.01); *H04N 2201/0094* (2013.01); *H04N 2201/3298* (2013.01)
USPC .......................................... 358/1.13; 358/1.1

(58) Field of Classification Search
CPC .......... H04L 1/00; H04L 2001/00; G06F 1/00
USPC ................................................. 358/1.13, 1.1
See application file for complete search history.

(56) References Cited

U.S. PATENT DOCUMENTS

| 2006/0206805 A1 | 9/2006 | Komamura | |
|---|---|---|---|
| 2009/0106757 A1* | 4/2009 | Kawajiri | ....................... 718/100 |

FOREIGN PATENT DOCUMENTS

| JP | 7-013817 A | 1/1995 |
|---|---|---|
| JP | 2006-085452 A | 3/2006 |
| JP | 2006-261889 A | 9/2006 |
| JP | 2007-272277 A | 10/2007 |

* cited by examiner

*Primary Examiner* — Martin Mushambo
(74) *Attorney, Agent, or Firm* — Canon USA, Inc. IP Division

(57) ABSTRACT

Information about a user is sent to a server from a device to perform authentication. A scan document generated by scanning a paper document is sent to the server from the device to request registration thereof. If the scan document, the registration of which has been requested from the device, has a size that exceeds free space in a contract area, the server extracts a document that meets a save condition from documents that should be stored in the contract area. The server then moves the extracted document from the contract area into a temporary area so as to register in the contract area the scan document the registration of which has been requested from the device. The server notifies a predetermined destination of information about the document moved into the temporary area.

15 Claims, 10 Drawing Sheets

SYSTEM, IMAGE FORMING APPARATUS, AND METHOD FOR EXTRACTING DATA FROM A SET OF ELECTRONIC DATA BASED ON A PREDETERMINED CONDITION

BACKGROUND OF THE INVENTION

1. Field of the Invention

The present invention relates to a technique for control performed when a document is registered in a management server from an image forming apparatus.

2. Description of the Related Art

Recently, devices, such as multi-function peripherals that have many functions including a scanner can be linked with services on the Internet. For example, such devices can send a document scanned by that device to a server on the Internet for registration of the document, or can download a document from the server to print the document by the device.

However, the amount of information that can be displayed on a display mounted on the device is smaller as compared with a personal computer (PC). Furthermore, the operability of interfaces, e.g., buttons, mounted on the device is lower than that of a keyboard and a mouse for a PC.

For example, the device does not have such a high degree of operability that enables a user to open and refer to documents on a server from the device to select a document to be deleted. Therefore, desired processing is to be executed with a minimum number of operations required in the device.

Conventionally, at the time a user attempts to upload a scan document scanned in by a device to a server for registration of the scan document, if free space in a contract area on the server is too small to register the scan document, the server returns an error to the device. In this case, the user cannot register the scan document.

Hence, the user is to delete, from a personal computer or other equipment, unnecessary ones of the documents registered in the contract area on the server to reserve free space in the contract area, and then attempt to register the scan document from the device again.

As described above, devices often do not have such high functionality that allows users to open and refer to documents on a server from the device. With user interfaces (UIs) currently available on devices, users cannot easily perform operations such as deleting appropriate documents.

To address this, a technique is discussed, for example, in Japanese Patent Application Laid-Open No. 07-013817. Specifically, for a file in a file storage device, a user can set beforehand an option indicating that the file can be deleted. If an overflow occurs at the time of registration of a new file, the unnecessary file is automatically deleted according to the setting of the option.

Also, in the technique discussed in Japanese Patent Application Laid-Open No. 07-013817, files in the file storage device are moved into a specific storage area, and only links are left in the original area. In this way, a recording area is secured in the file storage device. The files in the specific storage area are periodically saved to another storage medium.

Conventionally, as described above, when a contract area on a server does not have sufficient free space, the user is to perform the complicated operation of organizing documents in the contract area from a personal computer or other equipment, and then performing a registration process again.

In the technique discussed in Japanese Patent Application Laid-Open No. 07-013817, for each file in the file storage device, the user is to set in advance an option indicating that the file can be deleted or moved. Moreover, among the data already registered, data that the user desires to delete may change each time, depending on the data to be newly registered.

Japanese Patent Application Laid-Open No. 07-013817 is based on the assumption that the user can use any areas, including the file storage device, the specific storage area, and the other storage medium, without particular limitations, and hence uses, for example, links to manage files. However, recently, storage areas, including a save area, that can be used by users are generally limited. The technique discussed in Japanese Patent Application Laid-Open No. 07-013817 is thus practically difficult to employ.

Therefore, conventionally, when a contract area on a server does not have sufficient free space, it is difficult to properly complete registration of a scan document by performing a single document-registration operation from a device.

SUMMARY OF THE INVENTION

According to an aspect of the present invention, in a system which includes an apparatus including a reading unit for reading a document to generate electronic data, and a server including a storage unit for registering electronic data, the apparatus includes a sending unit configured to send information about a user to the server; and a registration request unit configured to send the generated electronic data to the server, and request registration of the electronic data in the storage unit. The server includes a determination unit configured to determine whether the electronic data requested by the apparatus to be registered has a size exceeding free space in a specific area in the storage unit secured according to the information about the user received from the image forming apparatus; a save storage unit configured to be temporarily usable to save electronic data that should be stored in the specific area; a registration unit configured to store in the specific area the electronic data requested to be registered, if the size of the electronic data requested to be registered does not exceed the free space in the specific area; an extraction unit configured to extract, according to a predetermined condition, electronic data from a set of electronic data that should be stored in the specific area, if the size of the electronic data requested to be registered exceeds the free space in the specific area; a control unit configured to perform control to move the extracted electronic data into the save storage unit so as to store in the specific area the electronic data requested to be registered; and a notification unit configured to notify a predetermined destination of information about the electronic data moved into the save storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

For ease of description of the present invention, various limitations are imposed on the following exemplary embodiments. However, the scope of the invention is not limited to the exemplary embodiments, unless otherwise specified in the following description.

Figure 1:
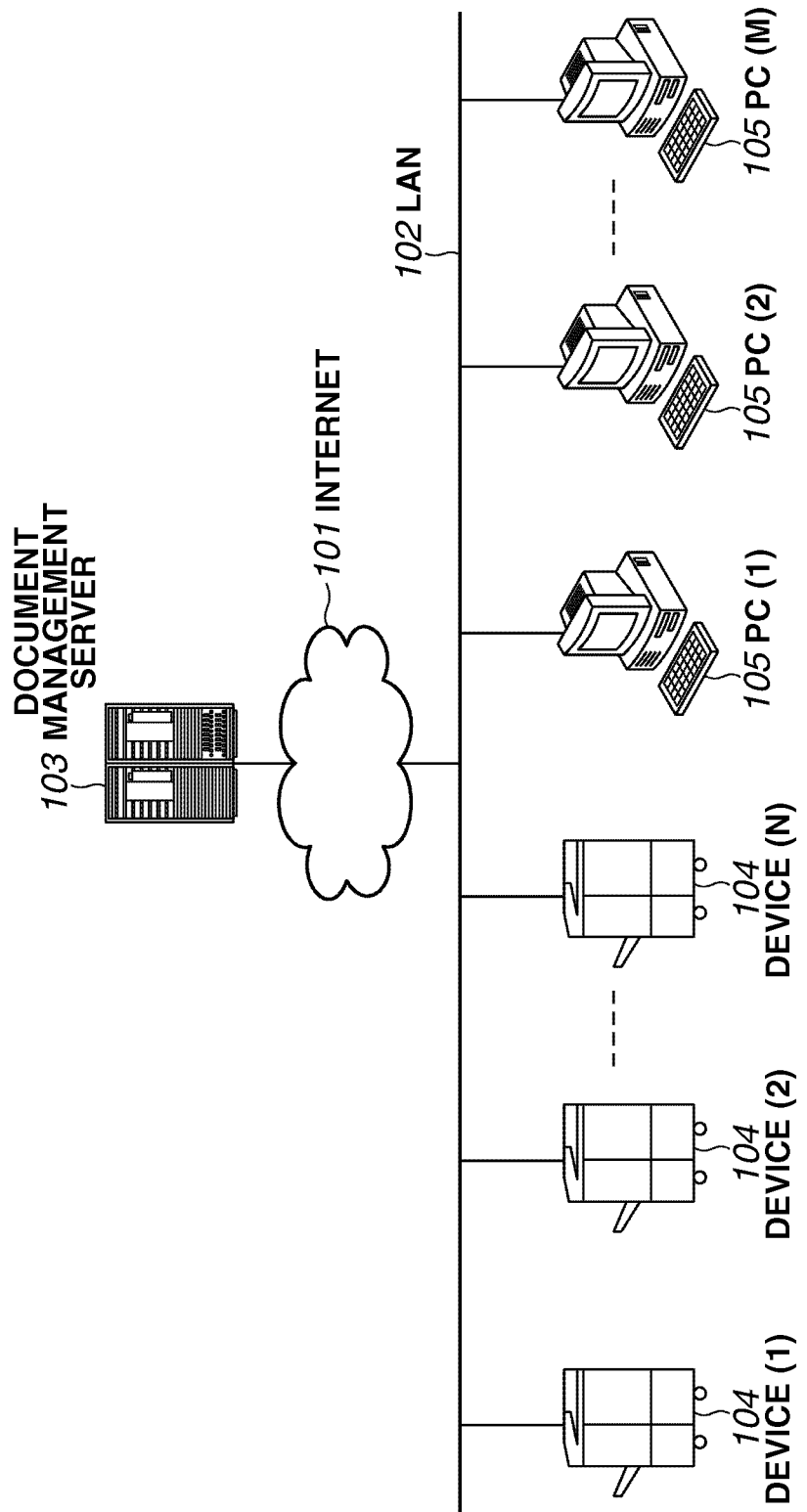
FIG. 1 illustrates the configuration of a document management system according to an exemplary embodiment of the present invention.

FIG. 1 illustrates the configuration of a document management system according to an exemplary embodiment of the present invention.

As illustrated in FIG. 1, in the document management system according to the present exemplary embodiment, a document management server 103 is connected over the Internet 101 so that communication therewith can be established. In the document management system according to the present exemplary embodiment, devices 104(1), 104(2), . . . , 104(N) and personal computers (PCs) 105(1), 105(2) . . . , 105(M) are connected over a local area network (hereinafter referred to as a "LAN") 102 so that communication can be established. The LAN 102 is also connected to the Internet 101 via, for example, a router (not illustrated) so that communication can be established. The term "PC", as used herein, means a personal computer.

The document management server 103 is an information processing apparatus capable of communicating with the devices 104 and the PCs 105. The document management server 103 receives requests sent via the Internet 101 from the devices 104 and the PCs 105. In response, the document management server 103 internally performs processes according to the respective process requests.

The document management server 103 may be composed of a single server computer, or may be, for example, a cloud server composed of multiple storage servers and management servers.

The devices 104 represent image forming apparatuses, such as printers, facsimile machines, and multi-function peripherals that are capable of scan sending, printing, and connecting to the Internet 101. In terms of functions required in the present exemplary embodiment, the devices 104(1), 104(2), . . . , 104(N) are configured in the same manner.

Therefore, for the sake of simplicity of description, a device 104(X) or a device 104(Y) (where X and Y represent a value from 1 to N), as used herein, denotes a specific device 104 of the devices 104(1), 104(2), . . . , 104(N). An unspecified device 104 of the devices 104(1), 104(2), . . . , 104 (N) is denoted simply as a device 104.

The PCs 105 are information processing apparatuses used by a user 501 (illustrated in FIG. 5 and to be described below) to control functions offered by the document management server 103. The user 501 is a user of the document management system according to the present exemplary embodiment.

The user 501 of the document management system accesses to the Internet 101 using, for example, a web browser held in a PC 105, and to the document management server 103 via the LAN 102. The user 501 can send a document to the document management server 103 for registration of the document, and can obtain documents and document information registered in the document management server 103.

In terms of functions required in the present exemplary embodiment, the PCs 105 (1), 105 (2), . . . , 105 (M) are configured in the same manner. Therefore, for the sake of simplicity of description, a PC 105(X) or PC 105(Y) (where X and Y represent a value from 1 to M), as used herein, denotes a specific PC 105 of the PC 105 (1), 105 (2), . . . , 105 (M). An unspecified PC 105 of the PCs 105 (1), 105 (2), . . . , 105 (M) is denoted simply as a PC 105.

Figure 2:
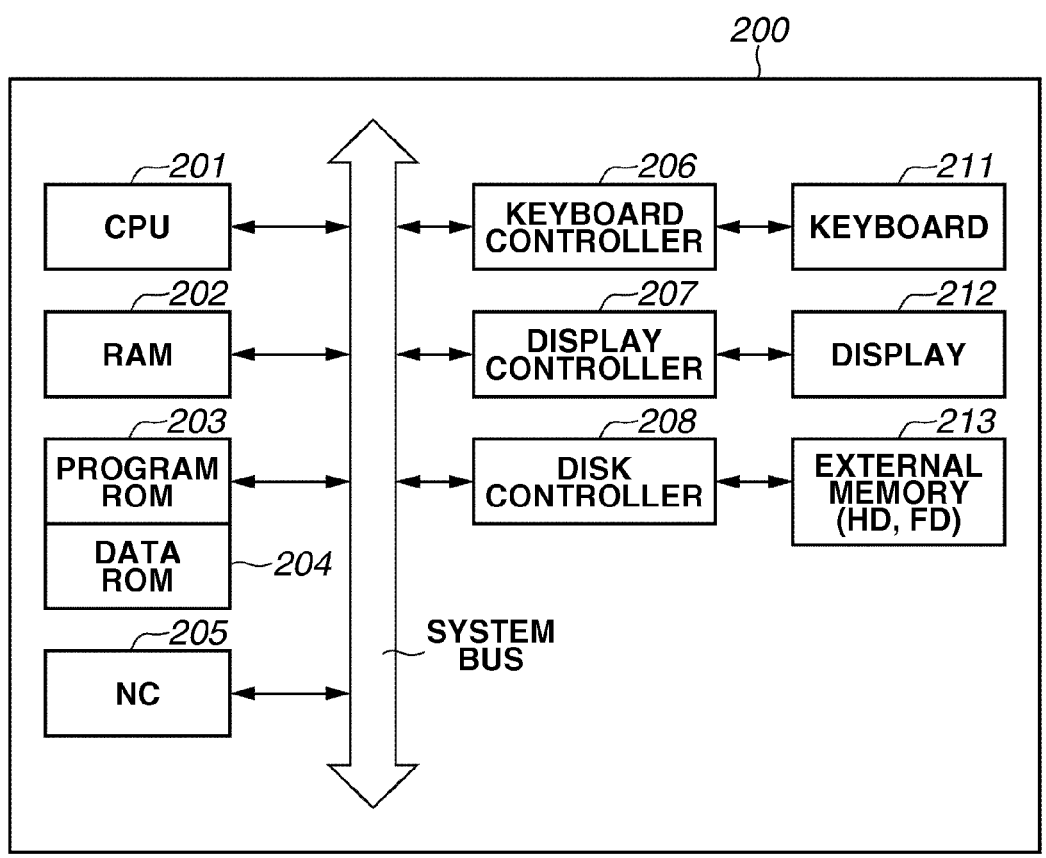
FIG. 2 is a block diagram illustrating an example hardware configuration of a document management server 103 and PC 105.

FIG. 2 is a block diagram illustrating an example hardware configuration of the document management server 103 and PC 105. The document management server 103 and the PC 105 correspond to the hardware of a typical information processing apparatus. In the description made referring to FIG. 2, the document management server 103 and the PC 105 are indicated as an information processing apparatus 200.

In FIG. 2, a central processing unit (CPU) 201 performs computations and control in the information processing apparatus 200. A random access memory (RAM) 202, serving as a main memory for the CPU 201, functions as an area for executable programs and an execution area and data area for those programs. The CPU 201 reads the executable programs into the RAM 202 from an external memory 213 (to be described below) to execute the programs.

On a program read only memory (ROM) 203, programs, such as a boot program for the information processing apparatus 200, are recorded in a computer-readable form. The CPU 201 executes the boot program upon startup of the information processing apparatus 200. On a data ROM 204, information, for example, required to provide functions of the information processing apparatus 200 is recorded. In place of the data ROM 204, the external memory 213 (to be described below) may be used.

A network controller 205 (hereinafter referred to as an "NC"), which is connected to a network, performs a process for controlling communication with other equipment connected to the network. A keyboard controller 206 controls key entries from a keyboard 211 (to be described below).

A display controller 207 performs rasterization of image data to display information in the information processing apparatus 200 on the screen of a display 212 (described below), and controls the display. A disk controller 208 controls input and output of data to and from the external memory 213 (described below). For example, in the document management server 103, such data controlled by the disk controller 208 includes managed documents and document information, and information about the user 501, who is a user of the document management system.

A keyboard and pointing device 211 is used by an operator of the information processing apparatus 200 to perform inputting operations. For example, in the present exemplary embodiment, the operator may perform the maintenance of the document management server 103 by operating the keyboard 211 while looking at information displayed on the display 212 (described below).

The display 212 is a display device, for example, a liquid crystal display (LCD). When the display 212 is a touch display, the display 212 may include functions equivalent to the keyboard and pointing device 211.

The external memory (a hard disk (HD) or a floppy disk (FD)) 213 is a storage device. In the external memory 213, basic software (operating system (OS)) and application programs are recorded in a computer-readable form. The basic software (OS), serving as a system program, controls units in the information processing apparatus 200.

In the present exemplary embodiment, examples of the application programs in the document management server 103 include software programs, such as a document management module 401 (illustrated in FIG. 4 and described below) for performing processes requested from the devices 104 and the PCs 105, for example. The external memory 213 is used to store various kinds of data.

Examples of the various kinds of data in the document management server 103 include documents and document information registered from the devices 104 and the PCs 105, and information about the user 501 of the document management system. The external memory 213 may be, for example, a hard disk drive, a flexible disk drive, or a solid-state drive.

Figure 3:
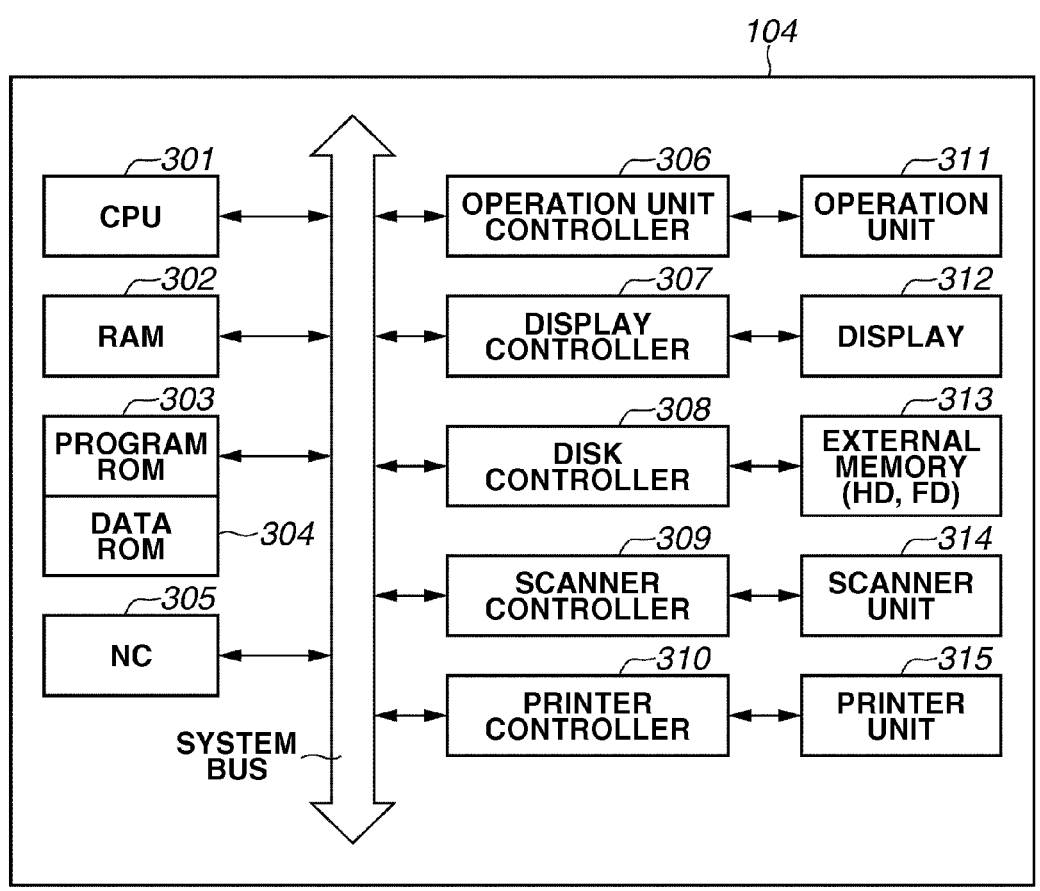
FIG. 3 is a block diagram illustrating an example hardware configuration of a device 104.

FIG. 3 is a block diagram illustrating an example hardware configuration of each device 104.

In FIG. 3, a CPU 301 performs computations and control in the device 104. A RAM 302, serving as a main memory for the CPU 301, functions as an area for executable programs and an execution area and data area for those programs.

A program ROM 303 stores programs, for example, various programs for controlling the device 104, an application program for conducting communication with the document management server 103, and a web browser.

On a data ROM 304, information, for example, required to provide functions of the device 104 is recorded. In place of the data ROM 304, an external memory 313, which will be described below, may be used.

A network controller (hereinafter referred to as an "NC") 305, which is connected to a network, performs a process for controlling communication with other equipment connected to the network. An operation unit controller 306 controls inputs from an operation unit 311 (described below).

A display controller 307 performs rasterization of image data to display information in the device 104 on the screen of a display 312 (described below), and controls the display. A disk controller 308 controls input and output of data to and from the external memory 313 which will be described below.

A scanner controller 309 controls a scan document 503, which is electronic data, generated by scanning a paper document (an original document) 502 with a scanner unit 314 (described below).

A printer controller 310 rasterizes information in the device 104 or information received via the Internet 101 and the LAN 102 into image data for printing, and performs control so that a printer unit 315 (described below) outputs the image data onto the paper document 502.

The operation unit 311 is used by an operator of the device 104 to perform inputting operations. The operation unit 311 corresponds to a hard key. The display 312 is a display device, for example, an LCD. When the display 312 is a touch display, the display 312 may include a function equivalent to the operation unit 311.

On the external memory (HD or FD) 313, data, for example, electronic data generated by scanning the paper document 502 by the scanner unit 314 (described below), is recorded. The external memory 313 is a hard disk drive, a flexible disk drive, or a solid-state drive, for example.

The scanner unit 314 is a scanner device used by the user 501 of the device 104 to scan the paper document 502. The printer unit 315 is a printer device used by the user 501 of the device 104 to print information in the information processing apparatus 200 or information received via the Internet 101 and the LAN 102. In the present exemplary embodiment, the printer unit 315 is not necessarily essential.

Figure 4:
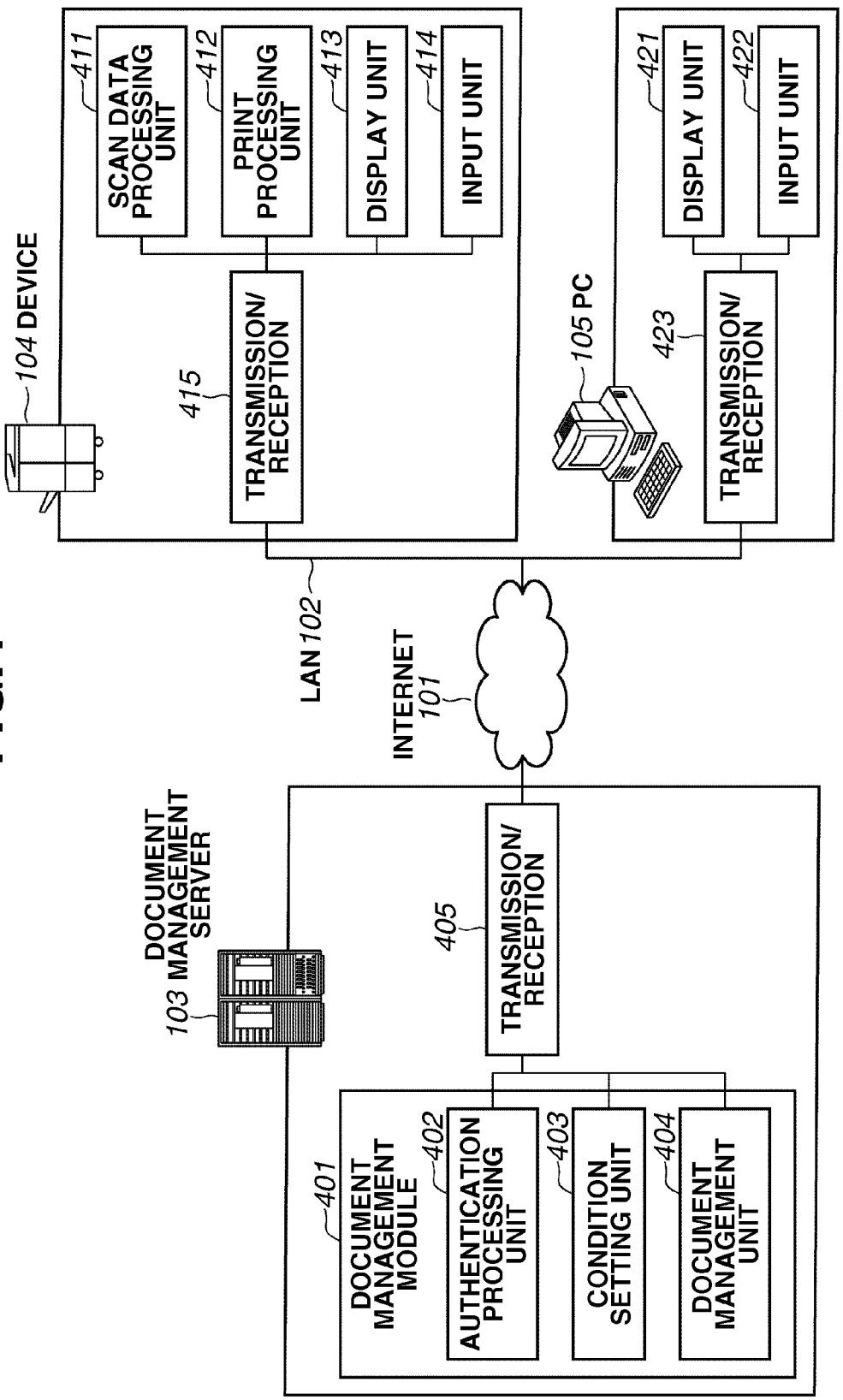
FIG. 4 illustrates example software configurations of the document management server 103, device 104, and PC 105.

FIG. 4 illustrates an example of software configurations of the document management server 103, device 104, and PC 105.

In FIG. 4, the document management server 103 includes the document management module 401. The document management module 401 includes a set of functions required for document management that the document management server 103 provides to the device 104 and the PC 105. Those functions are as follows.

An authentication processing unit 402 is one of the functions of the document management module 401. Upon receipt of a request for a process from the device 104 or the PC 105, the authentication processing unit 402 performs authentication to determine whether the user 501 (illustrated in FIG. 5) who is a user of the device 104 or the PC 105 is a contract user who has signed up, and is allowed, to use the document management system.

A condition setting unit 403 is one of the functions of the document management module 401. The condition setting unit 403 sets a condition for selecting candidates for a saved document 508 (illustrated in FIG. 5 and described below) according to the present exemplary embodiment.

A document management unit 404 is a main function of the document management module 401. The document management unit 404 manages folders 505 and documents 506 (illustrated in FIG. 5 and described below) registered from the device 104 and the PC 105.

A transmission/reception unit 405 in the document management server 103 communicates with, for example, the device 104 and the PC 105 using the Internet 101. The function units 401 to 405 are realized by the CPU 201 of the document management server 103 by reading and executing programs recorded on the external memory 213 in a computer-readable form.

A scan data processing unit 411 is provided if the device 104 has the function of scanning. The scan data processing unit 411 processes the scan document 503 (illustrated in FIG. 5) generated by scanning the paper document 502 (illustrated in FIG. 5 and described below) with the scanner unit 314 described with reference to FIG. 3.

A print processing unit 412 is provided if the device 104 has the function of printing. The print processing unit 412 performs processing for rasterizing the scan document 503 generated using the scanner unit 314 and information received via the LAN 102 into print image data to be printed in the printer unit 315, and transferring the data to the printer unit 315.

A display unit 413 is provided if the device 104 has a display function such as the display 312. The display unit 413 uses the display 312 to perform display processing, for example, to display an information input screen for user authentication performed by the authentication processing unit 402, and to display the folders 505 and documents 506 (both illustrated in FIG. 5) registered in the document management server 103.

An input unit 414 is provided if the device 104 has an input function, such as the operation unit 311. A transmission/reception unit 415 in the device 104 communicates with equipment on the network using the Internet 101 and the LAN 102.

The function units 411 to 415 are realized by the CPU 301 of the device 104 by reading and executing programs recorded on the program ROM 303 in a computer-readable form.

A display unit 421 represents a display function, such as the display 212 connected to the PC 105. The display unit 421 displays, for example, the information input screen for user authentication performed by the authentication processing unit 402, a condition set by the condition setting unit 403 for selecting candidates for the saved document 508, and the folders 505 and documents 506 registered in the document management server 103.

An input unit 422 represents an input function, such as the keyboard 211 of the PC 105. A transmission/reception unit 423 in the PC 105 communicates with equipment on the network using the Internet 101 and the LAN 102.

The function units 421 to 423 are realized by the CPU 201 of the PC 105 by reading and executing programs recorded on the external memory 213 in a computer-readable form.

Figure 5:
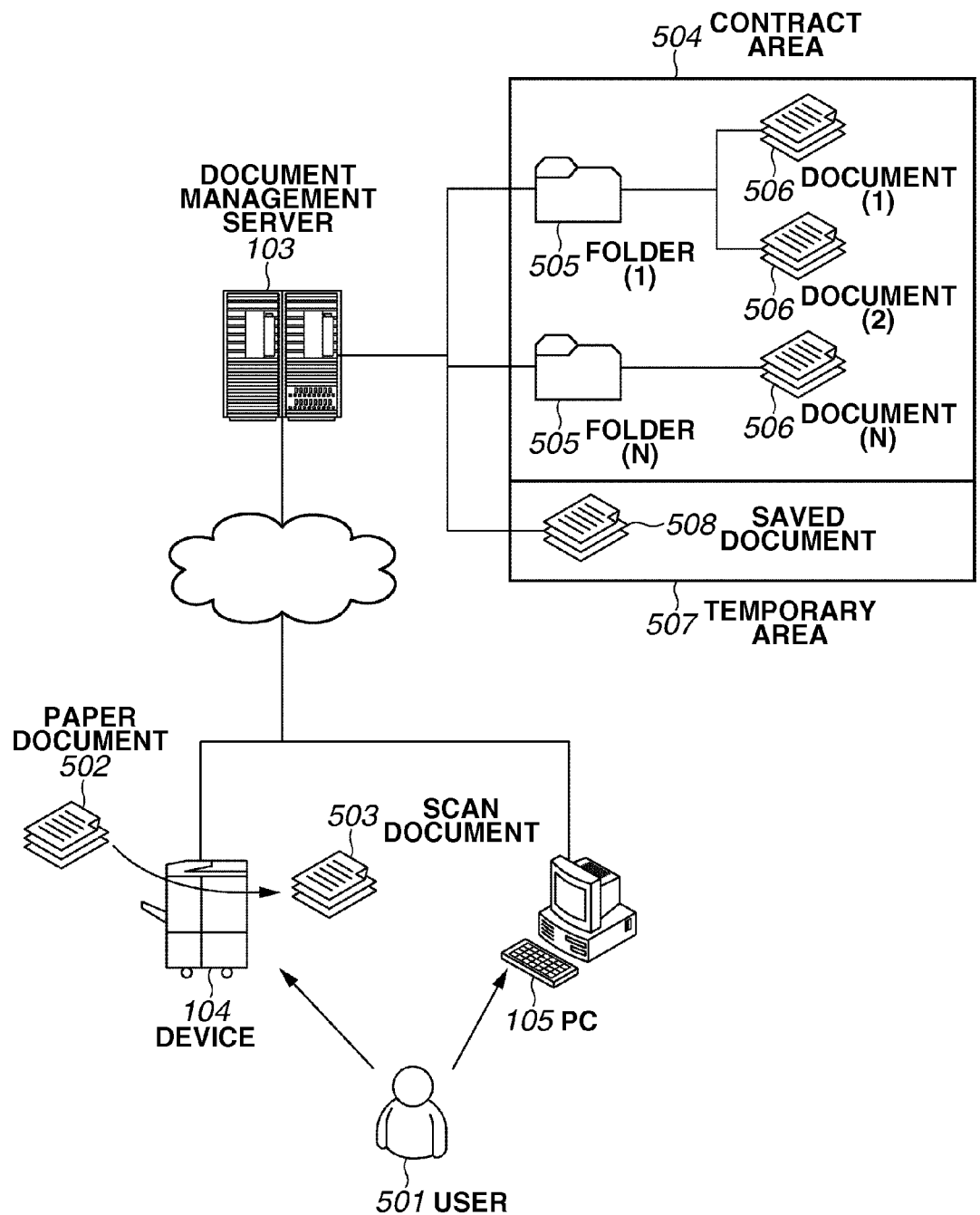
FIG. 5 illustrates an example configuration of a contract area usable by a user and managed on the document management server 103, folders and documents stored in the contract area, a temporary area according to an exemplary embodiment of the present invention, and a saved document managed in the temporary area.

FIG. 5 illustrates example configurations of a contract area usable by the user 501 and managed on the document management server 103, folders 505 and documents 506 stored in the contract area, a temporary area 507 according to the present exemplary embodiment of the invention, and a saved document 508 managed in the temporary area.

In FIG. 5, the user 501 of the document management system is a contract user who has signed up to use the contract area 504 (described below) on the document management server 103.

Generally, when making a contract to use a document management system, a single individual or company signs up. If multiple users, for example, in a company use the document management system, the folders 505 and documents 506 (described below) managed in the document management server 103 are treated as shared data. When such data sharing is not desired, an access right or other rights may be set so that only limited users can use the folders 505 and the documents 506.

The paper document 502 is an original document which is scanned by the user 501 using the scanner unit 314 of the device 104 to obtain data in electronic form. The scan document 503 is an electronic document obtained by scanning the paper document 502 with the scanner unit 314 of the device 104.

The contract area 504 is an area usable by the user 501. That is, the contract area 504 corresponds to an area for each contract user. In a typical document management system, each user can use a contract area up to the capacity of that contract area. If the user desires to use more capacity, the user is to carry out a procedure to expand the contract area 504.

Folders 505(1), . . . , 505(N) store the documents 506 (described below) managed in the contract area 504. The contract user 501 creates the folders 505(1), . . . , 505(N) arbitrarily. In a typical document management system, a user can create a hierarchical structure of folders to store a related plurality of documents 506 in one folder, thereby achieving efficient management of the contract area 504.

The documents 506(1), 506(2), . . . , 506(N) are managed in the contract area 504. The documents 506(1), 506(2), . . . , 506(N) are electronic documents (such as the scan document 503) registered by the user 501 of the contract area 504 using the device 104 or the PC 105.

The temporary area 507 corresponds to a save storage area that can be used temporarily. Specifically, when the user 501 who is attempting to register the scan document 503 from the device 104 in the contract area 504 usable by the user 501 cannot achieve the registration because the contract area 504 does not have free space, the user 501 can temporarily use the temporary area 507 to save some of the existing documents 506 stored in the contract area 504.

In the present exemplary embodiment, the temporary area 507 represents an area different from the contract area 504 that the user 501 has signed up for, and does not store data permanently. Documents that have been saved to the temporary area 507 can be placed back into the contract area 504 again.

The user 501 can use the temporary area 507 only when there is not free space at the time the scan document 503 is registered from the device 104. To avoid a situation in which the temporary area 507 is occupied, editing operations on the documents that have been saved and left in the temporary area 507 may be limited. For example, any operations other than deleting or placing those documents back into the contract area 504 may be prevented.

The document 508 is a saved document that has been saved to the temporary area 507 from the contract area 504. In the present exemplary embodiment, when the free space in the contract area 504 becomes insufficient, the document management server 103 can automatically save a document(s) to the temporary area 507 according to a save condition.

The saved document 508 saved to the temporary area 507 is stored only for a predetermined period of time set in the system. If the saved document 508 is not placed back into the contract area 504 within that period of time, the document management unit 404 automatically deletes the saved document 508 after the predetermined period of time has elapsed.

Referring to the flowcharts illustrated in FIGS. 6 and 7, processes performed in the document management system according to the present exemplary embodiment will be described.

Figure 6:
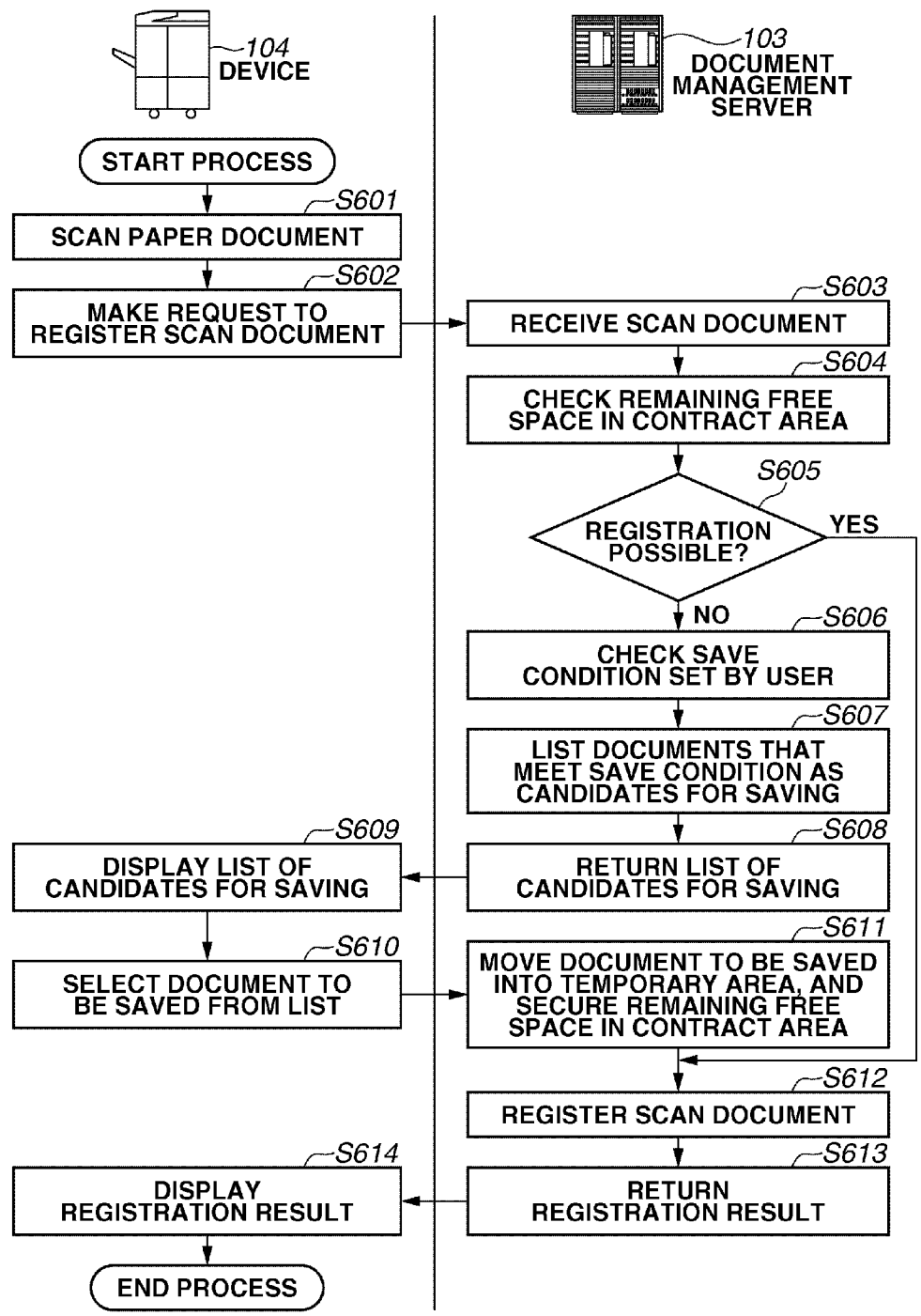
FIG. 6 is a flowchart illustrating an example of a document registration process in a document management system according to a first exemplary embodiment.

FIG. 6 is a flowchart illustrating an example of a document registration process in the document management system according to the present exemplary embodiment. This process corresponds to a process in which the contract user 501 of the document management system sends, using the device 104, the scan document 503 to the document management server 103 to register the scan document 503 in the contract area 504 on the document management server 103.

In FIG. 6, processing in the device 104 is accomplished by the CPU 301 of the device 104 by reading and executing a program recorded on the program ROM 303 in a computer-readable form.

Processing in the document management server 103 is performed by the CPU 201 of the document management server 103 by reading and executing a program recorded on the external memory 213 in a computer-readable form.

Step S601 is performed after authentication for the document management server 103 is complete. In step S601, in response to an operation by the user 501, the scanner unit 314 in the device 104 scans the paper document 502, and the scan data processing unit 411 generates the scan document 503.

Next, in step S602, in response to an operation by the user 501, the CPU 301 in the device 104 makes a request, using the transmission/reception unit 415, to register the scan document 503 generated in step S601 in a folder 505 in the contract area 504 on the document management server 103.

In step S603, in the document management server 103, the document management module 401 receives, through the transmission/reception unit 405, the request for registration of the scan document 503 made by the device 104 in step S602. Upon receipt of the request, the processing proceeds to step S604.

In step S603, the document management module 401 may receive the file entity of the scan document 503 together with the registration request made to the document management server 103, or may receive the file size of the scan document 503 from the device 104. Then, the document management server 103 can know the size of the scan document 503.

In step S604, the document management module 401 checks, using the document management unit 404, free space in the contract area 504 on the document management system that the user 501 has signed up for. Then, the processing proceeds to step S605.

In step S605, the document management module 401 compares the free space in the contract area 504 checked in step S604 with the file size of the scan document 503 received from the device 104 in step S603.

If the result of the comparison indicates that the scan document 503 can be registered in the free space in the contract area 504 (YES in step S605), the processing proceeds directly to step S612.

If the comparison result indicates that the scan document 503 cannot be registered in the contract area 504 because there is not sufficient free space therein (i.e., the remaining free space is small) (NO in step S605), then the processing proceeds to step S606.

In step S606, the document management module 401 checks a save condition for the documents 506 registered in the contract area 504. The user 501 of the device 104 has set in advance the save condition using the PC 105. Then, the processing proceeds to step S607. The setting of the save condition for the documents 506 performed by the user 501 will be described in detail below with reference to FIG. 8.

In step S607, the document management module 401 lists (extracts) documents 506 that meet the save condition checked in step S606 as candidate documents to be saved. Then, the processing proceeds to step S608.

In step S608, the document management module 401 generates information (a list of candidates for saving) for displaying the list of candidate documents to be saved that has been listed in the process in step S607 on the display 312 of the device 104. The document management module 401 then sends the generated information to the device 104 through the transmission/reception unit 405 (a list sending process).

In the device 104, when the transmission/reception unit 415 receives the list of candidate documents to be saved (the list of candidates for saving) sent from the document management server 103 in the process in step S608, the CPU 301 performs a process in step S609.

Figure 9:
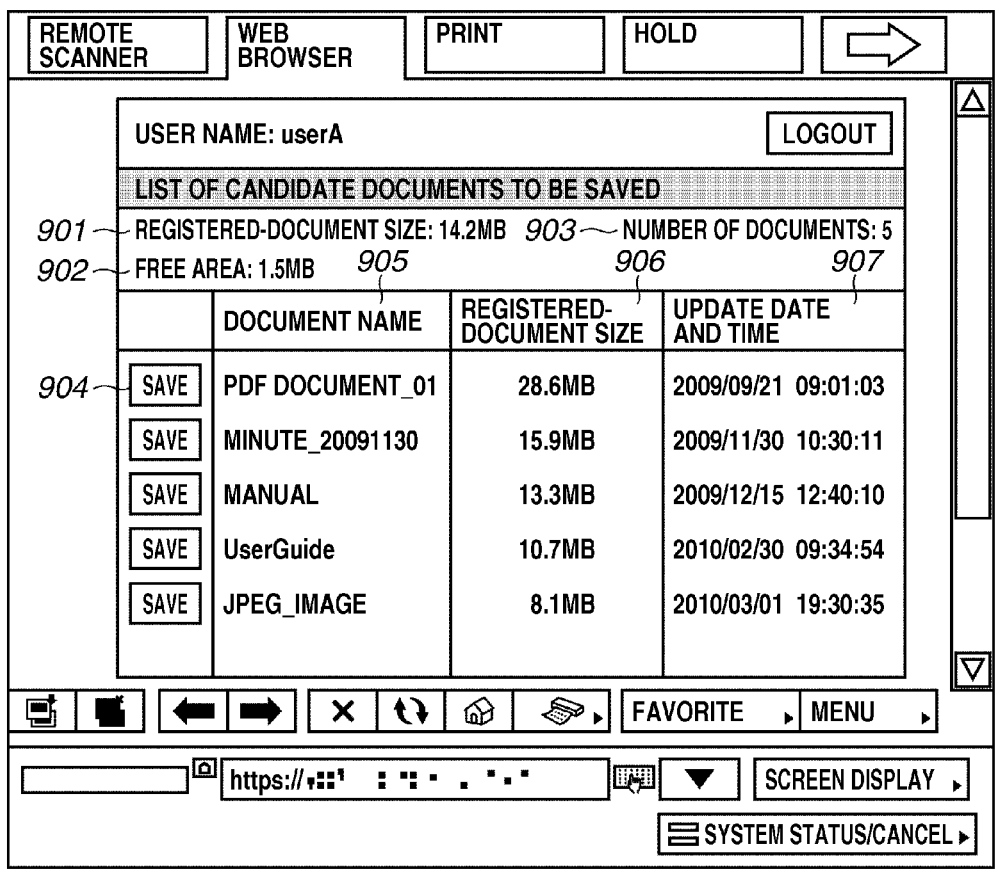
FIG. 9 illustrates an example of a screen that displays a list of candidate documents to be saved.

In step S609, the CPU 301 performs control, using the display unit 413, to display the received list of candidate documents to be saved on the display 312 of the device 104. As a result of this process, a screen such as illustrated in FIG. 9 (described below) is displayed on the display 312. Details of the screen will be described below with reference to FIG. 9.

Then, in step S610, the user 501 selects, with the input unit 414, a document 506 to be saved to the temporary area 507, from the displayed list of candidate documents to be saved. The CPU 301 detects this selection operation, and sends a request to save the selected document 506 to the temporary area 507 to the document management server 103 through the transmission/reception unit 415 (a selection result sending process). The user 501 may select a plurality of documents as documents to be saved.

In the document management server 103, upon receipt, through the transmission/reception unit 405, of the document saving request sent from the device 104 in step S610, the document management module 401 performs a process in step S611. In step S611, the document management module 401 causes the document management unit 404 to move into the temporary area 507 the document 506 to be saved that has been specified in the request made in step S610.

As a result of this process, since the document 506 to be saved that has been specified by the user 501 is moved into the temporary area 507, a free area is created and hence free space is secured in the contract area 504. Once a document is saved to the temporary area 507, that document is treated as a saved document 508.

Next, in step S612, the document management unit 404 in the document management module 401 registers the scan document 503 received from the device 104 in step S603 at a location in the free area in the contract area 504 secured in step S612. Then, the processing proceeds to step S614.

The process in step S612 also represents the process of registering the scan document 503 in the contract area 504 performed when the comparison result in the process in step S605 indicates that the scan document 503 can be registered in the free space in the contract area 504 (YES in step S605).

Subsequently, in step S613, the document management module 401 returns (sends) the result of the registration process performed in step S612 to the device 104. At this time, information about the document moved into the temporary area 507, for example, the name thereof, may also be sent to the device 104 as part of the registration process result.

In the device 104, the transmission/reception unit 415 receives the registration process result sent from the document management server 103 in step S613. Then, in step S614, the CPU 301 causes the display unit 413 to display the received registration process result on the display 312.

In the configuration illustrated in the flowchart of FIG. 6, the list of candidates for saving is sent to the device 104 to allow the user for selection of a document to be saved. However, some devices capable of reading documents do not even have a display unit such as illustrated in FIG. 9.

In that case, without the device's selection of a document to be saved, the document management server 103 may automatically save a document that meets the save condition and provide notification of the saved document.

More specifically, when the device 104 performs communication with the document management server 103, for example, in step S602, the device 104 may notify the document management server 103 of information about the device model. Then, the document management server 103 may determine the capability of the display unit 413 of the device 104 according to the model information, automatically select a document that meets the save condition, and save the selected document.

After having saved the document, the document management server 103 may notify, for example, the device 104 and the log-in user of the saved document. If a group to which the log-in user belongs to has signed up to use the contract area 504, the document management server 103 sends such notification to, for example, the mail address of a user who is a member of that group or the mail address of any appropriate representative member thereof.

Figure 7:
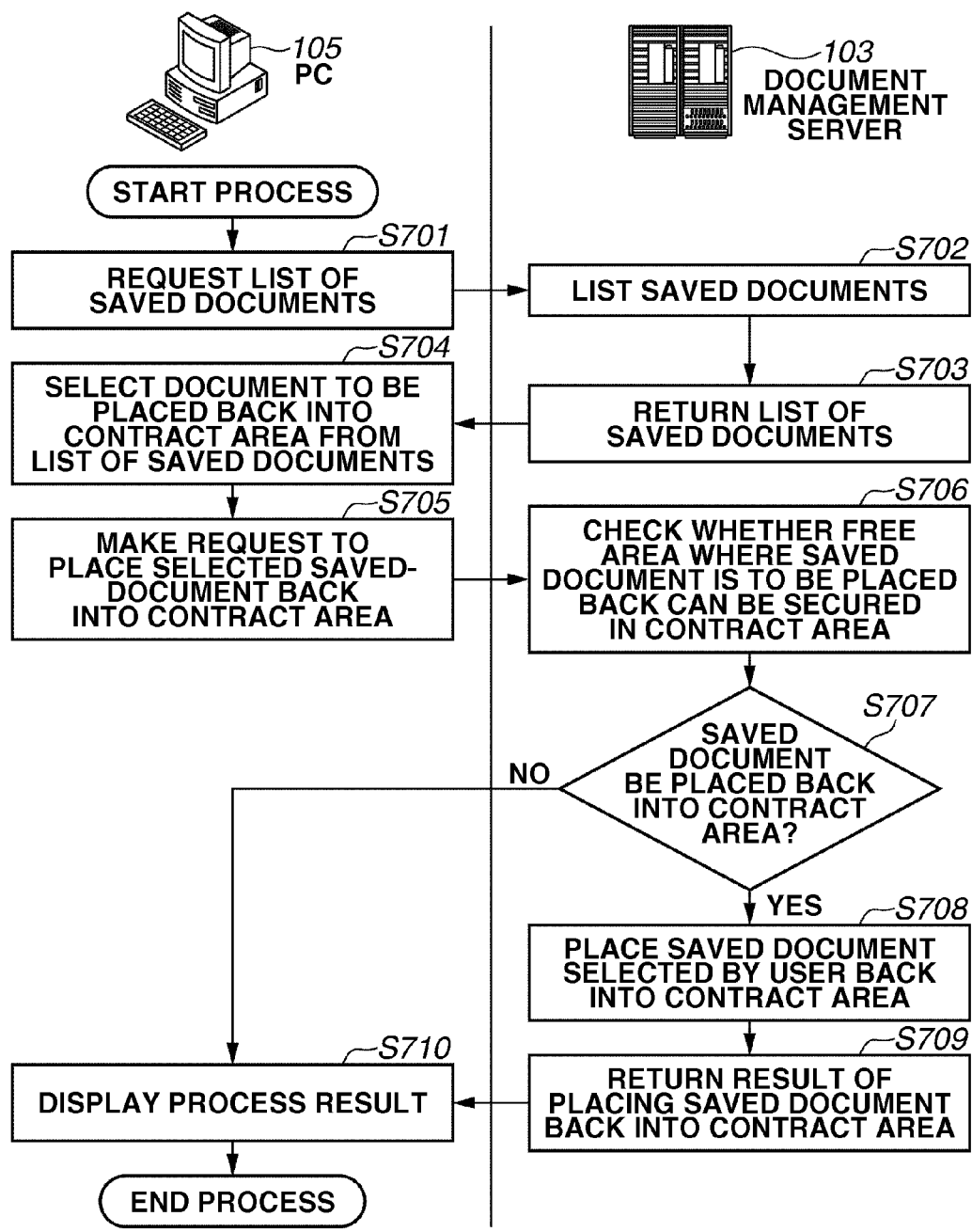
FIG. 7 is a flowchart illustrating an example of a saved-document manipulation process in the document management system according to the first exemplary embodiment.

With reference to FIG. 7, a process will be described in which the saved document 508 saved to the temporary area 507 on the document management server 103 is placed back into the contract area 504 by operating the PC 105.

FIG. 7 is a flowchart illustrating an example of a saved-document manipulation process in the document management system according to the present exemplary embodiment. In FIG. 7, processing in the PC 105 is performed by the CPU 201 of the PC 105 by reading and executing a program recorded, for example, on the external memory 213 of the PC 105 in a computer-readable form.

Processing in the document management server 103 is performed by the CPU 201 of the document management server 103 by reading and executing a program recorded, for example, on the external memory 213 of the document management server 103 in a computer-readable form.

In step S701, in response to an operation by the user 501, the CPU 201 of the PC 105 sends, through the transmission/reception unit 423, a request to the document management server 103 for a list of saved documents 508 saved to the temporary area 507.

In step S702, in the document management server 103, when the document management module 401 receives through the transmission/reception unit 405 the request for the list of saved documents sent from the PC 105 in step S701, the document management module 401 lists the requested saved documents 508.

The saved documents 508 listed in this process are the documents saved to the temporary area 507 by the user 501 using the PC 105 in the process illustrated in FIG. 6.

Next, in step S703, the document management module 401 generates information for displaying the list of saved documents listed in step S702 on the display 212 of the PC 105, and sends (returns) the information to the PC 105.

In the PC 105, when the transmission/reception unit 423 receives the information of the list of saved documents sent from the document management server 103 in the process in step S703, the CPU 201 of the PC 105 performs a process in step S704.

The CPU 201 of the PC 105 also performs control so that the received information (not illustrated) of the list of candidate documents to be saved is displayed on the display 212 of the PC 105.

Then, in step S704, when the user 501 selects, with the input unit 422, a saved document 508 to be placed back into the contract area 504 from the displayed list of saved documents, the CPU 201 of the PC 105 detects this selection operation.

Subsequently, in step S705, the CPU 201 of the PC 105 sends a request to place the saved document 508 selected in step S704 back into the contract area 504 to the document management server 103 through the transmission/reception unit 423.

In the document management server 103, upon receipt, through the transmission/reception unit 405, of the request to place the saved document 508 back into the contract area 504, sent from the PC 105 in step S705, the document management module 401 performs a process in step S706.

In step S706, the document management module 401 checks whether the saved document 508 specified to be placed back into the contract area 504 in the request made in step S705 can be placed back into the contract area 504. In this checking process, the document management module 401 checks whether the saved document 508 selected by the user 501 can be stored in the free space in the contract area 504.

If the document management module 401 determines that the saved document 508 can be placed back into the contract area 504 (YES in step S707), then in step S708, the document management module 401 causes the document management unit 404 to move (return) the saved document 508 into the contract area 504.

Then, in step S709, the document management module 401 sends (returns) the result of placing the saved document 508 back into the contract area 504 in the process in step S708 to the PC 105 thorough the transmission/reception unit 405.

When the document management module 401 determines that the saved document 508 can be placed back into the contract area 504, the user 501 may have performed a data organization operation such as deleting data in the contract area 504. If a plurality of users, for example, in a department, share the contract area 504, such determination may be made in a case where anyone of the users has performed a data organization operation on the contract area 504.

On the other hand, if the document management module 401 determines that the saved document 508 cannot be placed back into the contract area 504 (NO in step S707), the document management module 401 sends (returns) information indicating that the saved document 508 could not be placed back into the contract area 504 to the PC 105 thorough the transmission/reception unit 405. This information is the result of the process of placing the saved document 508 back into the contract area 504.

In the PC 105, when the transmission/reception unit 423 receives the result of the process of placing the saved document 508 back into the contract area 504, sent from the document management server 103, the CPU 301 performs a process in step S710. In step S710, the CPU 201 of the PC 105 causes the display unit 421 to display on the display 212 the received result of the process of placing the saved document 508 back into the contract area 504.

Figure 8:
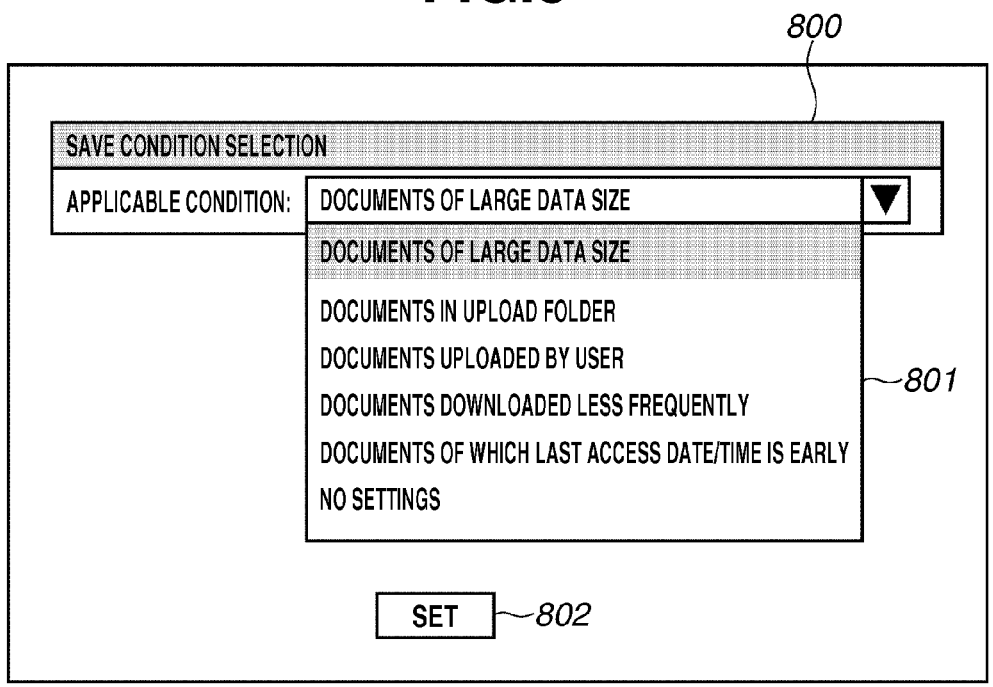
FIG. 8 illustrates an example of a save condition setting screen.

With reference to FIGS. 8 and 9, a save condition setting screen and a screen for displaying a list of candidate documents to be saved (which will sometimes be referred to as a "list-of-candidate-documents-to-be-saved display screen") will be described.

FIG. 8 illustrates an example of a save condition setting screen according to the first exemplary embodiment, which is displayed on the display 212 of the PC 105. The user 501 uses this screen to set a save condition in advance from the PC 105. A save condition is used when an existing document (s) 506 has to be saved to the temporary area 507 because the free space in the contract area 504 is too small at the time the scan document 503 is registered from the device 104.

In FIG. 8, the user 501 uses a selection field 800 to select a condition for selecting candidate documents to be saved to the temporary area 507 among the documents 506 already registered in the document management server 103.

The present exemplary embodiment employs a method in which the user 501 uses a pull-down control to select a save condition. However, instead of a pull-down control, other selection methods may also be employed. Moreover, in the selection method in the present exemplary embodiment, the user 501 can only select one save condition using the pull-down control. However, a plurality of selection fields may be provided to enable the user 501 to set a plurality of save conditions.

A set of options 801 is an example of options which is displayed when the user 501 opens the pull-down control 800. In the example illustrated in FIG. 8, the user 501 can select a condition for listing among the following options.

(1) documents of large data size,
(2) documents in upload folder,
(3) documents uploaded and registered by the user himself or herself (i.e., the user 501),
(4) documents downloaded less frequently, and
(5) documents of which the last access date/time is early.

When the user 501 sets the option (1) "documents of large data size", all or a predetermined number of documents are extracted in descending order of data size, or all or a predetermined number of documents having a data size larger than a predetermined size are extracted, as candidate documents to be saved.

If the user 501 sets the option (2) "documents in upload folder", all or a predetermined number of documents in the upload folder (the folder in the contract area 504 in which the user 501 is attempting to register a document) are extracted as candidate documents to be saved.

When the user 501 sets the option (3) "documents uploaded and registered by the user himself or herself (i.e., the user 501)", all or a predetermined number of documents uploaded and registered by the user himself or herself (the user 501) are extracted as candidate documents to be saved.

If the user 501 sets the option (4) "documents downloaded less frequently", all or a predetermined number of documents are extracted in ascending order of the number of times of downloads, or all or a predetermined number of documents that have been downloaded less than a predetermined number of times are extracted, as candidate documents to be saved.

If the user 501 sets the option (5) "documents of which the last access date/time is early", all or a predetermined number of documents are extracted in order of the last access date and time, from earliest to latest, or all or a predetermined number of documents of which the last access date and time is earlier than a predetermined date and time are extracted, as candidate documents to be saved.

In the present exemplary embodiment, "accessing a document" includes downloading the document, viewing the document, and/or viewing a list of documents in the folder containing that document.

Although not illustrated, a condition "documents of which the registration date/time is early" may also be provided as a save condition settable by the user 501. When the user 501 sets the save condition "documents of which the registration date/time is early", a predetermined number of documents are extracted in order of the registration date and time, from earliest to latest, or all or a predetermined number of documents with a registration date and time that is earlier than a predetermined date and time are extracted, as candidate documents to be saved.

If the user 501 sets a save condition "documents accessed less frequently", all or a predetermined number of documents are extracted in ascending order of the number of accesses, or all or a predetermined number of documents that have been accessed less than a predetermined number of times are extracted, as candidate documents to be saved. Conditions other than those described above may also be set as save conditions.

The list of saved documents sent by the document management module 401 to the PC 105 in step S703 illustrated in FIG. 7 is a list in which information of documents extracted according to one of the save conditions is arranged in the order of extraction. More specifically, the list of candidate documents to be saved, which is displayed on the list-of-candidate-documents-to-be-saved display screen illustrated in FIG. 9, indicates information of documents extracted according to one of the save conditions in the order of extraction. This enables the user 501 to easily select a document to be saved.

By pressing a setting button 802, the user 501 can send a save condition for candidate documents to be saved, selected using the pull-down control 800, to the document management server 103 from the PC 105. Upon receipt of the save condition, the condition setting unit 403 in the document management server 103 stores and manages the save condition in the external memory 313.

In the present exemplary embodiment, the user 501 uses the above-described save conditions to select candidate documents to be saved. However, other save conditions may also be set according to information about the documents 506 held in the document management server 103.

For example, the user 501 may register each document 506 together with information indicating that saving of that document 506 is allowed or not. Then, only the documents 506 with the information indicating that saving thereof is allowed may be selected as candidate documents to be saved. Alternatively, documents 506 with the information indicating that saving thereof is not allowed may be excluded from candidates for saving, even if those documents 506 meet a save condition set on the screen illustrated in FIG. 8.

FIG. 9 illustrates an example of a screen which displays a list of candidate documents to be saved. This screen is displayed on the display 212 of the device 104 in step S609 illustrated in FIG. 6. More specifically, this screen shows a list of candidates for a document 506 that is saved to the temporary area 507 if the contract area 504 on the document management server 103 does not have sufficient free space at the time the user 501 attempts to register the scan document 503 in the document management server 103 from the device 104.

In FIG. 9, the scan document 503 the registration of which has been requested from the device 104 to the document management server 103 has a size 901.

If the free space 902 in the contract area 504 described with reference to FIG. 5 is smaller than the size 901 of the scan document 503, this screen is displayed. The display of the free space 902 allows the user 501 to know how much the free space 902 should be increased in size to enable registration of the scan document 503 having the size 901.

The number of documents 506 that meets a save condition set on the screen in FIG. 8, which is indicated by reference numeral 903, is the number of documents contained in the list displayed on the screen in FIG. 9.

The user 501 uses a button 904 to specify (select) a document 506 to be saved. By pressing a button 904, the user 501 can select a document 506 to be saved and notify the document management server 103 of the selected document 506.

In the present exemplary embodiment, the user 501 uses a button 904 to select the document 506 to be saved. However, other controls (for example, a checkbox) may also be employed so that a plurality of documents can be selected.

Document name 905 is the name of each document 506 registered in the document management server 103. The document name 905 may be, for example, a file name under which a document 506 was registered in the document management server 103 or any name given to a document 506 by the user 501 of this system so that the user 501 can easily identify the document 506.

Size 906 indicates the size of each document 506 on the document management server 103. If the total size of the free space 902 and the document 506 specified using a save button 904 is larger than the size 901 of the scan document 503, the scan document 503 can be registered in the document management server 103.

Update date/time 907 indicates a date and time when each document 506 was last updated. In the present exemplary embodiment, the update date/time 907 is displayed as an example item. A different item may also be displayed depending on the save conditions illustrated in FIG. 8.

In the present exemplary embodiment, the processing in the contract area 504 that the user 501 has signed up for has been described. However, a plurality of users 501(1), 502 (2), . . . , 502 (N) can use the contract area 504 as a shared area.

As described above, in the present exemplary embodiment, when the free space in the contract area 504 on the document management server 103 is too small to register the scan document 503, the user 501 can easily complete processes, including saving an existing document 506 and finally registering the scan document 503, only by performing an operation on the device 104.

In the method described in the first exemplary embodiment, the user 501 uses the PC 105 to set a save condition for the documents 506 in the contract area 504. In a second exemplary embodiment, a configuration will be described in which save conditions are set on the device 104.

Figure 10:
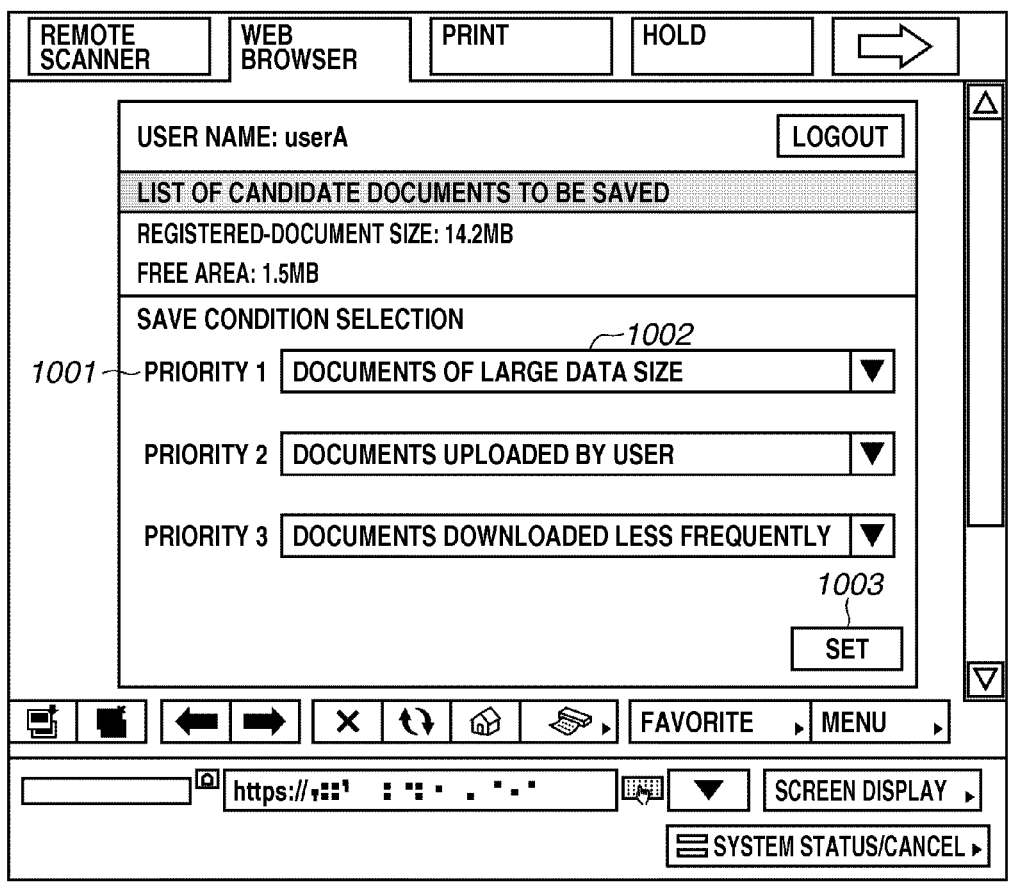
FIG. 10 illustrates an example of a save condition setting screen according to a second exemplary embodiment.

FIG. 10 illustrates an example of a save condition setting screen according to the second exemplary embodiment. The display 312 of the device 104 displays this screen. This screen is used to set save conditions from the device 104.

In FIG. 10, save conditions have priorities 1001. In the present exemplary embodiment, a plurality of save conditions can be set, and thus, priorities are assigned to the save conditions.

The user 501 uses selection fields 1002 to select conditions for selecting candidates for a document that is saved to the temporary area 507 among the documents 506 already registered in the document management server 103. The present exemplary embodiment employs a method in which the user 501 uses pull-down controls to select save conditions. However, instead of pull-down controls, other selection methods may also be employed. Options in each pull-down control 1002 are the same as the options 801 illustrated in FIG. 8.

By pressing a setting button 1003, the user 501 can send save conditions for candidate documents to be saved, selected using the pull-down controls 1002, to the document management server 103 from the device 104. Upon receipt of the save conditions, the condition setting unit 403 in the document management server 103 stores and manages the save conditions in the external memory 313.

In the present exemplary embodiment, priorities are assigned to a plurality of save conditions. However, instead of assigning priorities, an AND operation (AND) may be performed for a plurality of save conditions. As described above, according to the present exemplary embodiment, the user 501 can set save conditions from the device 104.

In the configuration described in the present exemplary embodiment, save conditions are set in advance. However, when the document management server 103 determines "No" in step S605 illustrated in FIG. 6, i.e., when the remaining free space is too small to register the scan document 503, the save condition setting screen illustrated in FIG. 10 may be sent to the device 104 upon such determination so as to allow the user 501 to set save conditions on the device 104 at this point in time.

In the configuration described according to the first exemplary embodiment, the user 501 selects from the PC 105 the saved document 508 that is to be placed back into the contract area 504 from the temporary area 507. However, the system may also be configured so that the saved document 508 that is to be placed back into the contract area 504 from the temporary area 507 is selected from the device 104.

In that case, the system may be configured so that the process in FIG. 7 performed by the PC 105 is carried out by the device 104. This configuration enables the user 501 to perform, from the device 104, processes including the selection of the saved document 508 that is to be placed back into the contract area 504 from the temporary area 507.

In the present exemplary embodiment, the user 501 sets save conditions on the device 104, while the document management server 103 selects a document to be saved. Therefore, the user 501 of the device 104 is to be notified of the saved document later. This notification to the user 501 may be made by displaying the saved document on the display 312 of the device 104 immediately after the scan document 503 is registered as illustrated in steps S613 and S614 in FIG. 6.

This notification may also be made by sending electronic mail to one or more predetermined destinations (for example, the mail address of the registered user 501 and/or the mail address of a user who belongs to the same group as the user 501).

In the configurations described in the exemplary embodiments described above, a document is registered in a management server from a device such as a multi-function peripheral. However, other configurations may also be employed in which information, such as an image captured by a camera, is registered in a document management server from a smartphone, a mobile phone, a digital camera connectable to a network, or other equipment.

As described above, in the exemplary embodiments of the present invention, even if free space in a contract area on a document management server is too small to register a scan document, the user can easily complete processes, including saving a registered document and finally registering the scan document, only by performing an operation on a device. The user does not need to perform again a process for registering the scan document from the device.

Accordingly, when registering a scan document from a device, the user can complete the registration process in a single registration operation.

The configurations and contents of the above-described various kinds of data are not limited to those described above, and may have any other configurations and contents according to applications and purposes.

While the present invention has been described with reference to the exemplary embodiments, the present invention is also applicable to other embodiments, such as a system, an apparatus, a method, a program, and a storage medium, for example. Specifically, the present invention may be applied to a system composed of multiple pieces of equipment or to an apparatus composed of a single piece of equipment. Furthermore, any configurations obtainable by combining the exemplary embodiments set forth above are within the scope of the present invention.

The present invention may also be realized by performing the following process. Specifically, software (program) for realizing the functions of the above-described exemplary embodiments is provided to a system or an apparatus via a network or any storage medium, and a computer (or a CPU or a microprocessor unit (MPU)) in the system or apparatus reads and executes the program.

The present invention may be applied to a system composed of a plurality of apparatuses or to an apparatus composed of a single piece of equipment.

The present invention is not limited to the exemplary embodiments described above. Various changes and modifications (including any organic combinations of the exemplary embodiments) may be made based on the spirit of the invention, and those changes and modifications are not excluded from the scope of the invention. Any configurations obtainable by combining the foregoing exemplary embodiments and modified examples thereof are within the scope of the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-014741 filed Jan. 27, 2011, which is hereby incorporated by reference herein in its entirety.

What is claimed is:

1. A system including an image forming apparatus including a reading unit for reading a document to generate electronic data, and a server including a storage unit for registering electronic data, wherein the image forming apparatus includes:
a sending unit configured to send information about a user to the server; and
a registration request unit configured to send the electronic data generated by the reading unit to the server, and request registration of the electronic data in the storage unit; and wherein the server includes:
a determination unit configured to determine whether the electronic data requested by the image forming apparatus to be registered has a size exceeding free space in a specific area in the storage unit secured according to the information about the user received from the image forming apparatus;
a save storage unit configured to be temporarily usable to save electronic data to be stored in the specific area;
a registration unit configured to store in the specific area the electronic data requested to be registered, if the size of the electronic data requested to be registered does not exceed the free space in the specific area;
an extraction unit configured to extract, according to a predetermined condition, electronic data from a set of electronic data to be stored in the specific area, if the size of the electronic data requested to be registered exceeds the free space in the specific area;
a control unit configured to perform control to move the extracted electronic data to the save storage unit from the specific area so as to store in the specific area the electronic data requested to be registered; and
a notification unit configured to notify one or more predetermined destinations of information about the electronic data moved to the save storage unit from the specific area, wherein the predetermined destination is related to the information about the user, wherein the predetermined condition includes at least one condition from among a condition for extracting electronic data in descending order of data size, a condition for extracting electronic data registered by a user who has made a request for registration, a condition for extracting electronic data in ascending order of a number of downloads.

2. The system according to claim 1, wherein the server further includes a deletion unit configured to delete electronic data that has been stored in the save storage unit for a predetermined period of time.

3. The system according to claim 1,
wherein the server further includes a list sending unit configured to send to the image forming apparatus a list of electronic data extracted by the extraction unit, as a list of candidates for saving;
wherein the image forming apparatus further includes:
a selection unit configured to select electronic data to be saved to the save storage unit, from the list of candidates for saving; and
a selection result sending unit configured to send, to the server, information about the selected electronic data to be saved; and
wherein the control unit moves electronic data corresponding to the information about the selected electronic data to be saved, into the save storage unit from the specific area, the information being received from the image forming apparatus.

4. The system according to claim 1, wherein the server further includes a sending unit configured to send to the image forming apparatus information for setting the predetermined condition to be used when the size of the electronic data exceeds the free space in the specific area; and
wherein the image forming apparatus further includes a setting unit configured to set the predetermined condition in the server according to the information for setting the predetermined condition.

5. An image forming apparatus for communicating with a server including a storage unit for registering electronic data, and a save storage unit for saving electronic data, the apparatus comprising:
a reading unit configured to read a document to generate electronic data;
a sending unit configured to send information about a user to the server;
a registration request unit configured to send the electronic data generated by the reading unit to the server, and request registration of the electronic data in a specific area in the storage unit secured according to the information about the user;
a receiving unit configured to receive, as a list of candidates for saving, from the server a list of electronic data extracted according to a predetermined condition from a set of electronic data to be stored in the specific area, if the electronic data requested to be registered has a size exceeding free space in the specific area;
a selection unit configured to select electronic data to be saved to the save storage unit, from the list of candidates for saving; and
a selection result sending unit configured to send, to the server, information about the selected electronic data to be saved.

6. The apparatus according to claim 5, wherein electronic data that has been stored in the save storage unit for a predetermined period of time is deleted.

7. A method in a system including an image forming apparatus including a reading unit for reading a document to generate electronic data, and a server including a storage unit for registering electronic data, and a save storage unit for saving electronic data, the method comprising:
sending information about a user to the server;
sending the electronic data generated by the reading unit to the server and requesting registration of the electronic data in the storage unit,
wherein the image forming apparatus performs the sending of the information, the sending of the electronic data, and the registration request;
determining whether the electronic data requested by the image forming apparatus to be registered has a size exceeding free space in a specific area in the storage unit secured according to the information about the user received from the image forming apparatus;
storing in the specific area the electronic data requested to be registered, if the determined size of the electronic data requested to be registered does not exceed the free space in the specific area;

extracting, according to a predetermined condition, electronic data from a set of electronic data to be stored in the specific area, if the determined size of the electronic data requested to be registered exceeds the free space in the specific area;

performing control to move the extracted electronic data to the save storage unit from the specific area so as to store in the specific area the electronic data requested to be registered; and notifying one or more predetermined destinations of information about the electronic data moved to the save storage unit from the specific area, wherein the predetermined destination is related to the information about the user, wherein the server performs the determination, the storing, the extraction, the control, and the notification, and wherein the predetermined condition includes at least one condition from among a condition for extracting electronic data in descending order of data size, a condition for extracting electronic data registered by a user who has made a request for registration, a condition for extracting electronic data in ascending order of a number of downloads.

8. The method according to claim 7, further comprising deleting electronic data that has been stored in the save storage unit for a predetermined period of time.

9. The method according to claim 7, further comprising
sending to the image forming apparatus a list of the extracted electronic data, as a list of candidates for saving;
selecting electronic data to be saved to the save storage unit, from the list of candidates for saving;
sending, to the server, information about the selected electronic data to be saved; and
moving electronic data corresponding to the information about the selected electronic data to be saved, into the save storage unit from the specific area, the information being received from the image forming apparatus.

10. The method according to claim 7, further comprising notifying a plurality of destinations corresponding to the information about the user.

11. The method according to claim 7, further comprising:
sending to the image forming apparatus information for setting the predetermined condition to be used when the size of the electronic data exceeds the free space in the specific area; and
setting the predetermined condition in the server according to the information for setting the predetermined condition.

12. A method in an image forming apparatus for communicating with a server including a storage unit, and a save storage unit for saving electronic data, the method comprising:
reading a document to generate electronic data;
sending information about a user to the server;
sending the generated electronic data to the server and requesting registration of the electronic data in a specific area in the storage unit secured according to the information about the user;
receiving, as a list of candidates for saving, from the server a list of electronic data extracted according to a predetermined condition from a set of electronic data to be stored in the specific area, if the electronic data requested to be registered has a size that exceeding free space in the specific area;
selecting electronic data to be saved to the save storage unit, from the received list of candidates for saving; and
sending, to the server, information about the selected electronic data to be saved.

13. The method according to claim 12, wherein electronic data that has been stored in the save storage unit for a predetermined period of time is deleted.

14. A non-transitory computer-readable storage medium on which is stored a computer program for making a computer execute a method for an image forming apparatus for communicating with a server including a storage unit for registering electronic data, and a save storage unit temporarily usable to save electronic data, the method comprising:
reading a document to generate electronic data;
sending information about a user to the server;
sending the generated electronic data to the server and requesting registration of the electronic data in a specific area in the storage unit secured according to the information about the user;
receiving, as a list of candidates for saving, from the server a list of electronic data extracted according to a predetermined condition from a set of electronic data to be stored in the specific area, if the electronic data requested to be registered has a size that exceeds free space in the specific area;
selecting electronic data to be saved to the save storage unit, from the received list of candidates for saving; and
sending, to the server, information about the selected electronic data to be saved.

15. The non-transitory computer-readable storage medium according to claim 14, wherein electronic data that has been stored in the save storage unit for a predetermined period of time is deleted.

* * * * *